United States Patent [19]

Bartels et al.

[11] Patent Number: 5,244,065
[45] Date of Patent: Sep. 14, 1993

[54] PANTOGRAPH SLIPPER FOR CURRENT COLLECTORS

[75] Inventors: Sven Bartels, Markdorf, Fed. Rep. of Germany; Johann Hoell, Hallstatt, Austria

[73] Assignee: Hoffmann & Co. Elektrokohle Gesellschaft mbH, Steeg, Austria

[21] Appl. No.: 768,268

[22] PCT Filed: May 3, 1990

[86] PCT No.: PCT/EP90/00711
§ 371 Date: Oct. 18, 1991
§ 102(e) Date: Oct. 18, 1991

[87] PCT Pub. No.: WO90/13453
PCT Pub. Date: Nov. 15, 1990

[30] Foreign Application Priority Data

May 3, 1989 [DE] Fed. Rep. of Germany ....... 3914675

[51] Int. Cl.5 ................................................. B60L 5/08
[52] U.S. Cl. ................................... 191/87; 191/59.1
[58] Field of Search .................. 191/45 R, 50, 54, 55, 191/59.1, 67, 87

[56] References Cited

U.S. PATENT DOCUMENTS

| 1,802,076 | 4/1931 | Tovaros | 191/55 |
| 2,029,857 | 2/1936 | Conradty | 191/55 |
| 4,578,546 | 3/1986 | Ferguson | 191/59.1 X |
| 5,176,230 | 1/1993 | Odot | 191/87 |

FOREIGN PATENT DOCUMENTS

| 0078159 | 5/1983 | European Pat. Off. . | |
| 0406987 | 1/1991 | European Pat. Off. | 191/55 |
| 559501 | 9/1932 | Fed. Rep. of Germany . | |
| 685147 | 11/1939 | Fed. Rep. of Germany | 191/55 |
| 308739 | 7/1955 | Fed. Rep. of Germany | 191/55 |
| 1044143 | 11/1958 | Fed. Rep. of Germany | 191/55 |
| 1060900 | 7/1959 | Fed. Rep. of Germany | 191/55 |
| 1115758 | 10/1961 | Fed. Rep. of Germany | 191/55 |
| 3905962 | 4/1990 | Fed. Rep. of Germany | 191/87 |
| 0043502 | 3/1982 | Japan | 191/55 |
| 0018201 | 1/1991 | Japan | 191/55 |
| 1039754 | 9/1983 | U.S.S.R. | 191/55 |
| 148529 | 11/1921 | United Kingdom | 191/55 |
| 882339 | 11/1961 | United Kingdom | 191/55 |
| 936258 | 9/1963 | United Kingdom | 191/55 |
| 1374972 | 11/1974 | United Kingdom . | |

Primary Examiner—Frank E. Werner
Assistant Examiner—Scott L. Lowe
Attorney, Agent, or Firm—Townsend and Townsend Khourie and Crew

[57] ABSTRACT

A pantograph slipper for current collectors. The pantograph includes a center section and laterally, downwardly directed horns. The center section and the horns are fitted with carbon layers which are cemented to a support and to each other and they form a gradual transition between them. A rupture detection device including a pressure channel extending along the center section and the horns is formed in the carbon layers.

2 Claims, 1 Drawing Sheet

PANTOGRAPH SLIPPER FOR CURRENT COLLECTORS

The invention relates to a pantograph slipper or sliding strip for current collectors. A pantograph slipper of this type is known from EP-OS 0 000 980. The lateral pantograph horns of the carrier can form a single piece with the carrier, or they can be made separate therefrom, and they serve to intercept the electric overhead wire as it approaches from the side and to guide it onto the top surface of a carbon sliding strip. The pantograph horns have no current conducting function Modern rail systems subject such pantograph horns to much stress and heavy wear due to the frequent change of overhead wires in operation. Even when the horns are made of wear resistant materials such as steel, or have a wear reducing metal layer, the problem arises that the overhead wire carries metal particles from the horns onto the carbon sliding strip. Further, due to different wear characteristics a step can form at the joint between the pantograph horns and the sliding strip. Such step degrades the smooth guidance of the overhead wire and subjects the current collector to large dynamic stresses.

An object of the present invention is therefore to devise pantograph horns for a slipper of the aforementioned type which are wear-resistant and improve the guidance of the overhead wire over the horns.

The present invention solves this objective by providing the pantograph slipper with a center section and a pantograph horn at each end thereof which is directed downwardly relative to the center section; i.e. which is either curved or angled downwardly. Carbon layers on the center section and the horns are cemented to a carrier of the pantograph and to each other at their respective joints. The thickness of the carbon layer on the horns increases in a direction towards the center section, and the layers have an outer contour forming a smooth and gradual transition. A rupture detector formed by a pressure channel extends longitudinally over the length of carbon layers for detecting damage to all carbon layers, including specifically on the horn.

An embodiment of the present invention is described in detail with reference to the drawings, in which.

Figure 1:
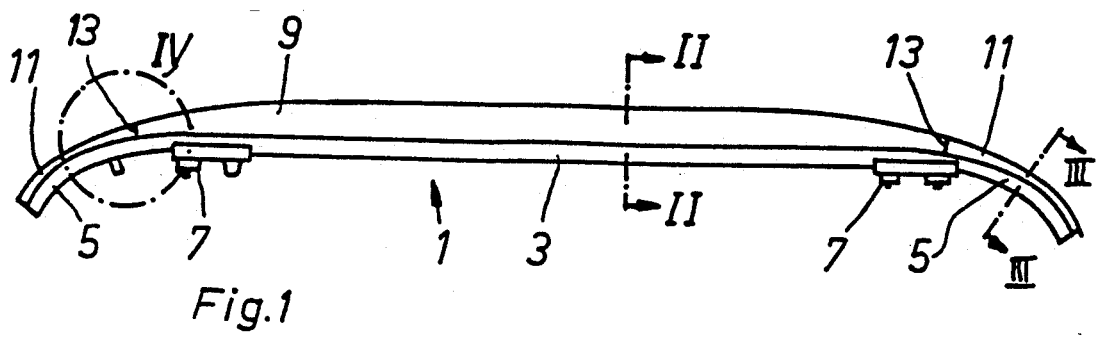
FIG. 1 is a schematic side view of a slipper made in accordance with the present invention.
Figure 2:
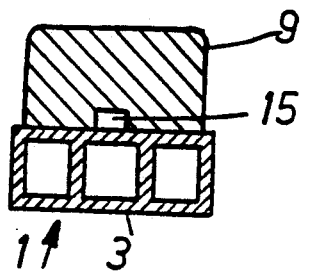
FIGS. 2 and 3 are cross-sections of the slipper along lines II—II and III—III of FIG. I.

According to FIG. 1 a pantograph slipper has a carrier 1, preferably made as a single piece from a profiled member of steel, aluminum or plastic, especially fiber-reinforced plastic. Carrier 1 includes a straight, or only slightly curved center section 3 and a curved pantograph horn 5 attached to each end thereof. Connectors 7 are applied to the underside of carrier 1 for mounting it to the pantograph of the current collector and establishing electrical contacts.

A sliding strip 9 made of carbon is cemented to the upper side of, and extends over the length of center section 3 of carrier 1. A carbon layer 11 is also cemented onto each pantograph horn 5 and it has a lesser height than sliding strip 9. In this embodiment sliding strip 9 and carbon layers 11 are formed as separate pieces but abut each other at a joint 13 which is preferably cemented. The height of each carbon layer 11 increases towards joint 13, and in some cases the height of the slipper decreases in such a way that the outer surfaces of the two parts form a smooth, gradual transition.

Figure 4:
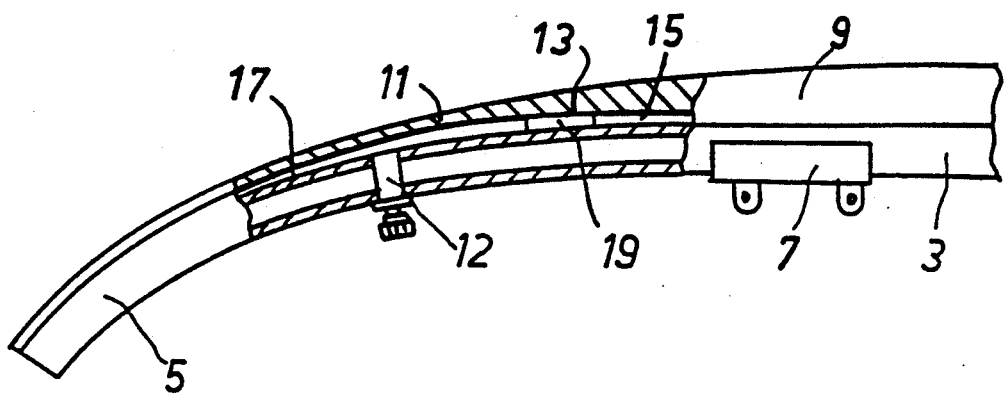
FIG. 4 is a longitudinal cross-section of the slipper at area IV of FIG. 1.

As is generally known, the slipper may also be provided with a rupture detection device. For this purpose the sliding strip has an airtight channel 15 connected to a source of pressurized air or gas and a detector for signalling when the pressure in the channel drops. Three of the interior walls of channel 15 are formed by the carbon material of the sliding strip itself or by a metal layer, such as copper, galvanically applied thereto, while the fourth, lower wall may be defined by carrier 3 or by another galvanically applied metal layer bridging over channel 15. When a rupture occurs, or when sliding strip 9 is excessively worn, channel 15 leaks and the rupture or wear causes a drop in pressure. According to FIG. 4 the present invention extends the leak detection to carbon layers 11 on horns 5. The latter receives a corresponding channel 17 which is connected to channel 15 of sliding strip 9 by a tube 19 bridging joint 13. A nipple 12 in the vicinity of one of the pantograph horns 5 can be used to connect the channel to the pressurized gas source and the pressure drop detector.

As an alternative to the above described embodiment, the present invention also provides to form carbon layers 11 on pantograph horns 5 together as a single piece with sliding strip 9.

Figure 3:
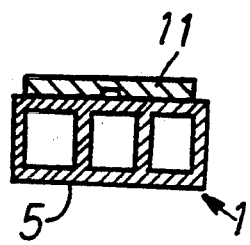

According to FIGS. 1 and 3 each layer 11 has a constant height or thickness over a major portion of the length of pantograph horns 5 with a gradual increase in height only in the vicinity of joint 13. Alternatively, each layer 11 may also gradually increase in height over its entire length.

We claim:

1. A pantograph slipper for current collectors comprising a carrier (1) having a center section (3) with a pantograph horn (5) at each end extending in a downward direction relative to the center section, a sliding strip (9) made of carbon attached to the center section of the carrier and a carbon layer (11) on each pantograph horn (5), said sliding strip (9) and carbon layers (11) being cemented to the carrier (1) and the joint (13) between each carbon layer (11) and the sliding strip being also cemented, each carbon layer (11 being formed of a single piece and having a thickness which is less than that of the sliding strip (9) and increases in the direction of the sliding strip (9) so that the outer contour forms a smooth, gradual transition with the outer contour of the sliding strip (9), the pantograph slipper further comprising a rupture detection device formed by a pressure channel (15) extending longitudinally within the sliding strip (9) and the carbon layers (11) of the pantograph horns and being connectable to a source of pressurized gas, and a detector for signalling a pressure drop.

2. A pantograph slipper for current collectors comprising a carrier having a center section, a pantograph horn attached to each end of the center section and extending in a downward direction relative to the center section, a sliding strip made of carbon attached to the center section of the carrier and a carbon layer on each pantograph horn, said sliding strip and carbon layers being cemented to the carrier, a substantially airtight, cemented joint between each carbon layer and the sliding strip, each carbon layer being formed of a single piece and having a thickness which is less than that of the sliding strip and increases in the direction of the sliding strip so that the outer contour form a smooth, gradual transition with the outer contour of the sliding strip, and a rupture detection device including means for an airtight containment of a fluid medium defined by walls of the sliding strip and the carbon layers forming a pressure channel extending longitudinally along the sliding strip and the carbon layers of the pantograph horns, means for connecting the pressure channel to a source of pressurized gas, and a detector for signalling a pressure drop.

* * * * *